May 26, 1942.  H. I. MORRIS  2,283,942
WELDING APPARATUS
Filed Nov. 22, 1940  2 Sheets-Sheet 1
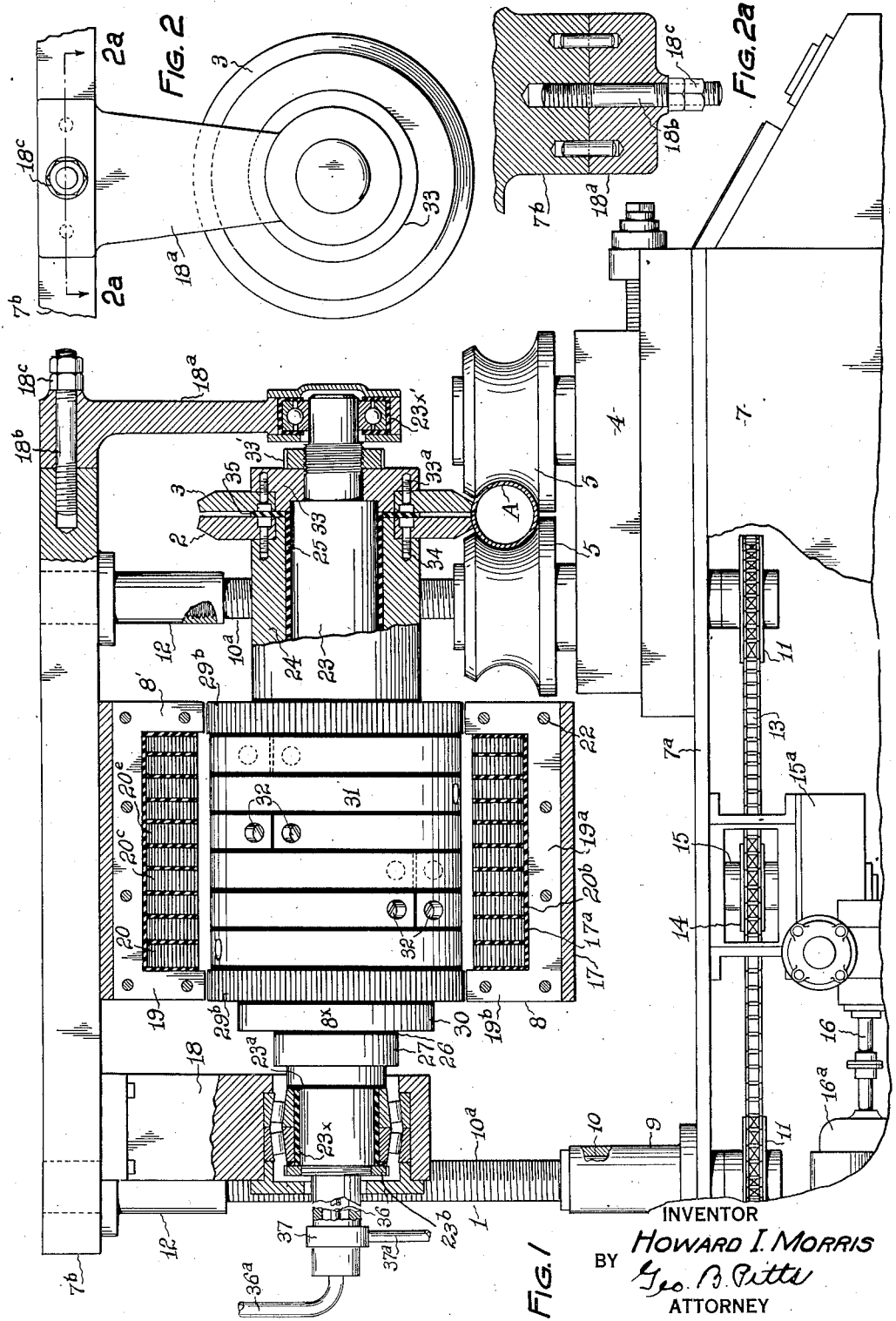
INVENTOR
HOWARD I. MORRIS
BY Geo. B. Pitts
ATTORNEY

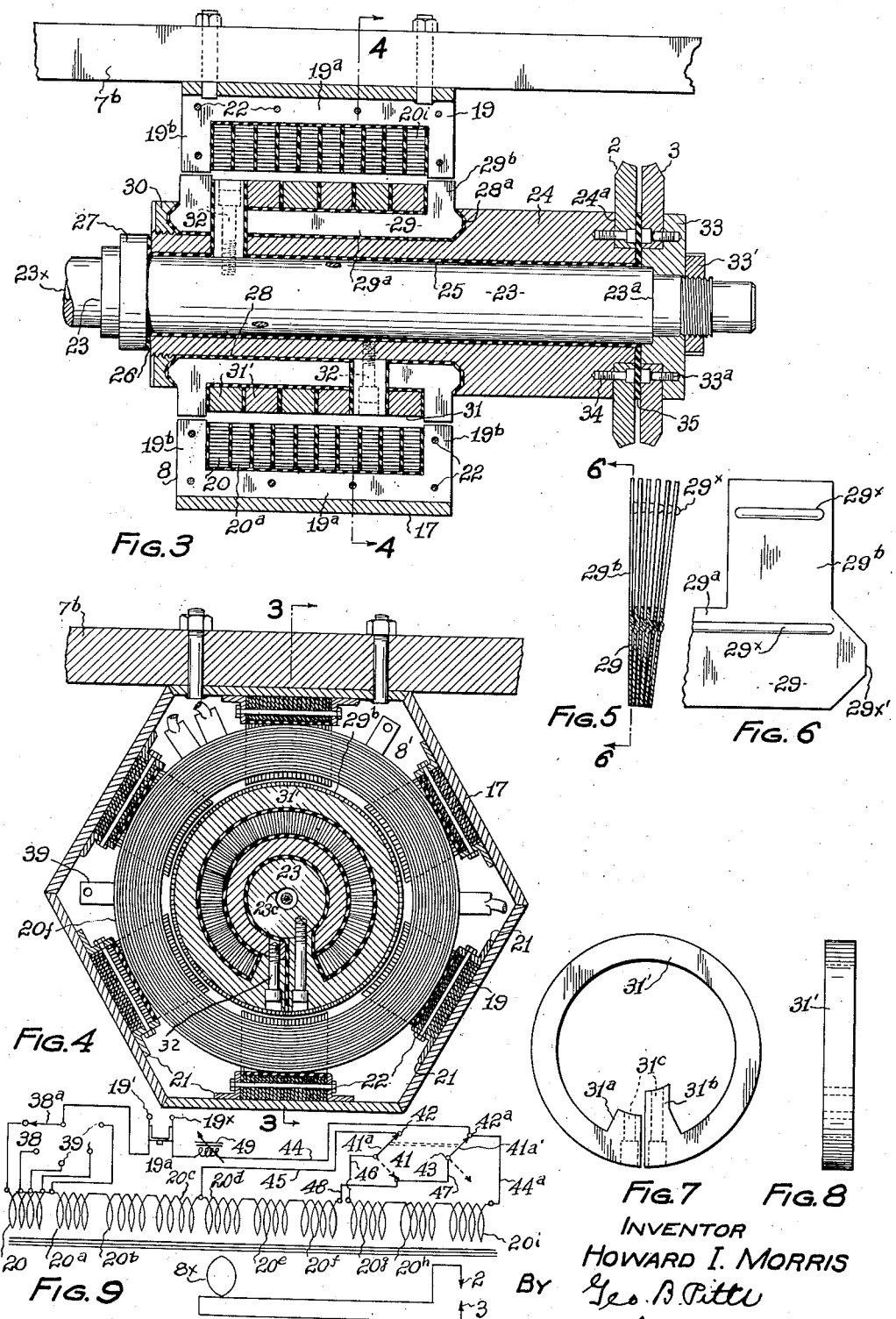

Patented May 26, 1942

2,283,942

UNITED STATES PATENT OFFICE 2,283,942

WELDING APPARATUS

Howard I. Morris, Lakewood, Ohio, assignor of one-third to Carl M. Yoder and one-third to Harvey O. Yoder, both of Lakewood, Ohio Application November 22, 1940, Serial No. 366,521

1 Claim. (Cl. 219—6)

This invention relates to welding apparatus having rotatable electrodes, more particularly a welding apparatus wherein the electrodes and the transformer constitute a unitary structure.

In all transformers utilized in welding apparatus employing rotatable electrodes, of which I have knowledge, it has been necessary to provide a plurality of brushes between the secondary winding or windings and the rotatable electrodes or where the transformer rotated with the electrodes, to provide a plurality of brushes between the primary coils or windings and the current supply mains, so that a large number of parts, to provide for these brushes, the adjustment thereof and regulation of the voltage was required.

One object of the invention is to provide an improved transformer having its secondary winding electrically connected to rotatable electrodes, but wherein brushes or equivalent devices are entirely eliminated.

Another object of the invention is to provide an improved transformer having stationarily mounted primary windings and a rotatable secondary winding, whereby the latter may be directly connected to rotatable electrodes for welding and the ratio of the primary windings to the secondary winding may be readily changed to adjust the voltage or welding current.

Another object of the invention is to provide an improved transformer wherein the secondary winding rotates relative to the primary winding and the secondary winding consists of a plurality of rings the terminals of each of which are so disposed, relative to the terminals of each of the remaining rings angularly of its axis that the current induced in and flowing from the secondary winding is devoid of fluctuations.

Another object of the invention is to provide an improved transformer having few parts of simple construction and readily assembled.

A further object of the invention is to provide an improved transformer having a rotatable secondary winding connected to rotatable welding electrodes wherein provision is readily made for mounting the electrodes and secondary winding for rotation as a unit and the electrodes are connected in a simple manner to the terminals of the secondary winding.

Other objects of the invention will be apparent to those skilled in the art to which my invention relates from the following description taken in connection with the accompanying drawings, wherein Fig. 1 is a view of a transformer embodying my invention, partly in section and partly in side elevation.

Fig. 2 is a fragmentary elevational view looking toward the left of Fig. 1.

Fig. 2a is a section on the line 2a—2a of Fig. 2.

Fig. 3 is a fragmentary sectional view on the line 3—3 of Fig. 4.

Fig. 4 is a section on the line 4—4 of Fig. 3.

Fig. 5 is a fragmentary section of the core for the secondary member.

Fig. 6 is a view of the line 6—6 of Fig. 5.

Fig. 7 is a plan view of one of the rings constituting the secondary winding.

Fig. 8 is an end view of the ring shown in Fig. 7.

Fig. 9 is a diagram of the electric circuit.

In the drawings, 1 indicates as an entirety a welding apparatus having electrodes 2, 3, and 4 indicates as an entirety a mechanism for feeding the work A to be welded. The work A shown merely for illustrative purposes consists of piping which is engaged by one or more pairs of rolls 5, 5 of the mechanism 4 (only one pair being shown), to maintain its side edges in position to be welded. Certain of the pipe-engaging rolls are mounted on suitably supported shafts arranged to be driven by a power means (not shown) so as to feed the pipe endwise.

The welding apparatus 1 consists of a frame 7 arranged to movably support a transformer indicated as an entirety at 8, whereby the electrodes 2, 3, which are carried by the secondary member of the transformer, may be adjusted relative to the pipe A to accommodate the electrodes 2, 3, to different sizes of pipe and to insure adequate frictional contact of the electrodes with the work, since the movement of the latter is relied upon through such contact to rotate the secondary member of the transformer. The frame 7 consists of a base member 7a and a member 7b, which supports the transformer 8 as hereinafter set forth. The member 7b is mounted on the base member 7a for adjustment vertically in the following manner: 9 indicates a plurality of standards (preferably four in number) fixed to the frame 7 and each forming a bearing for a shaft 10, which extends at its lower end through an opening in the base member 7a and carries on such end below the latter a sprocket 11. The upper portion of each shaft 10 is threaded as shown at 10a, so as to be screw threaded into a tubular member 12 (which constitutes a nut) fixed to and depending from the member 7b. 13 indicates a chain engaging with the sprockets fixed to all of the shafts 10 and an intermediate sprocket 14 which is fixed to a shaft 15. The shaft 15 is mounted in suitable bearings provided on the base member 7a and walls of a gear box 15a and driven through suitable gear reduction by the shaft 16 of a motor 16a, the operation of which through the chain 13 and sprockets 11 serves to simultaneously rotate the shafts 10, whereby the member 7b is raised or lowered.

17 indicates a hollow member fixed to and depending from the member 7b and surrounding the primary member 8' of the transformer 8. 18, 18a, indicate hangers carried by and depending from the member 7b and provided with antifriction bearings arranged to rotatably support the secondary member (indicated as an entirety at 8x) of the transformer 8.

The primary member 8' consists of a plurality of cores 19 uniformly spaced about the transformer axis, each core being formed of steel laminations shaped to form a bottom portion 19a and inwardly extending end portions 19b, and a plurality of windings fitting within the end portions 19b of the cores against the bottom 17a thereof. For illustrative purposes I provide ten windings 20, 20a, 20b, 20c, etc., each formed of copper tape. Each winding is suitably insulated from each other winding and the core portions 19a, 19b. The primary windings are connected to supply mains 19', 19x, in the manner hereinafter set forth. The laminations forming each core 19 are positioned between a pair of angles 21, which are suitably secured to the inner sides of the shell or hollow member 17, which is preferably of hexagonal shape. The laminations of each core are secured together by suitable bolts 22, certain of which extend through the angles 20 to secure the cores thereto. The secondary member 8x surrounds, and the terminals of its winding are connected to the inner and outer concentrically related conductors 23, 24, suitably insulated from each other and rigidly connected to the electrodes 2, 3, respectively, the inner conductor 23 being extended at one end beyond that end of the outer conductor 24 remote from the electrodes 2, 3, for mounting in the bearings in the hanger 18, and its opposite end being extended beyond the electrode 3 for mounting in the bearings in the hanger 18a, whereby the secondary winding, the electrodes and the conductors from the winding to the electrodes rotate as a unitary structure. The conductors 23, 24, are preferably formed of copper and are insulated from each other by a sleeve 25 of insulation of material and an annulus 26 of the same material between a collar 27 provided on the inner member 23 to serve as an abutment against which the adjacent end of the outer member is secured as later set forth. The extended end portion of the inner member 23 is reduced to form a shoulder 23a against which the adjacent bearing races are held by a nut 23b. That portion of the member 24 which extends through the transformer is cut away as shown at 28 to accommodate a core 29, which surrounds the outer member 24. The core 29 consists of steel laminations formed with suitable struck-up portions 29x to form spacers between them so that the laminations will be uniformly disposed radially circumferentially of the outer member 24. The core 29 is secured against the end wall 28a of the cut-away 28 by a nut or collar 30 threaded on the adjacent end of the outer member 24. The end wall 28a and inner face of the nut 30 are formed with alined circumferential recesses to receive lateral projections or wings 29x' on the opposite ends of the laminations. The secondary winding, indicated as an entirety at 31, may be wound in any desired manner, but in the illustrated form it extends circumferentially of the transformer axis. In this arrangement the laminations forming the core 29 are shaped to form a bottom portion 29a and outwardly extending side portions 29b, which aline with the side portions 19b of the cores 19, the secondary winding 31 fitting between the side portions 29b and surrounding the bottom portion 29a and suitably insulated from such portions as shown in Fig. 3. The secondary winding 31 preferably comprises a plurality of ring-like members 31' formed of copper and arranged in side-by-side relation between the core side portions 29b and suitably insulated from each other, the opposite ends of each member 31' being closely related, so that the member will be substantially continuous. The opposite ends of each member 31' are provided with inwardly extending lugs 31a, 31b, the lug 31a engaging the outer member 24 to provide an electrical connection therewith and the lug 31b extending through an opening formed in the outer conductor member 24 (but suitably insulated from the walls of said opening) and engaging the inner conductor member 23 to provide an electrical connection therewith. Each of the ring ends and the adjacent lug is formed with a through opening 31c to receive a screw 32, the inner end of which is threaded into the adjacent conductor member to rigidly secure the lug thereto and insure electrical connection from the ring to said member. As will be understood from Figs. 1 and 3, the ring-like members 31' are so arranged that the connections of their ends with the conductor member 23 are at different points circumferentially thereof, that is, the pairs of terminal lugs 31a, 31b, are uniformly spaced around the conductor member 23, such arrangement serving to eliminate fluctuations in the secondary current.

The electrodes 2 and 3 are mounted on the outer ends of the conductor members 23, 24, and electrically connected thereto, such mounting for illustrative purposes being as follows: the conductor member 23 adjacent its outer end is reduced to form a shoulder 23a' against which a collar 33 is secured by a nut 33' threaded on the reduced end portion of the member 23, the collar 33 being formed with a recess to fit over the 23a' whereas the marginal portion of the collar 33 on its inner face is recessed circumferentially to form a seat for the electrode 3, which is secured to the collar by bolts 33a. The outer end of the conductor member 24 is formed with a circumferential recess 24a to form a seat for the electrode 2, which is secured to the member 24 by bolts 34. The electrodes are insulated from each other by an annular disk 35. The outer end of the inner member 23 is mounted in the bearings carried by the hanger 18a.

As shown in Fig. 1, the races for the bearings carried by the hanger 18 are insulated from the inner member 23 by a sleeve 23x formed of suitable insulation material and the races for the bearings carried by the hanger 18a are insulated from the latter by suitable insulation material indicated at 23x'.

It will be noted that the hanger 18a is removably mounted on a pin 18b extending outwardly from the adjacent end of the supporting member 7b and secured to the latter by a nut 18c threaded on the outer end of the pin. Accordingly, by backing up and removing the nut 18c, the hanger 18a may be moved outwardly to disengage the adjacent bearing from the outer end of the member 23 and then swung to an inoperative position or removed from the pin 18b, this arrangement and mounting of the hanger 18a permitting assembly and disassembly of the electrodes.

The inner conductor member 23 is formed with a through opening 23c to receive a pipe 36 which supplies a cooling medium (such as water) to the outer end of the member 23, the supply pipe being of a size to permit the medium to flow through the opening to a coupling 37 to which a discharge pipe 37a is connected. The pipe 36 extends through the coupling 37 and is connected to a supply pipe 36a.

The primary windings 20, 21a, 21b, etc., may be connected to the supply mains 19', 19x, in any desired manner; also, by the provision of suitable switches or cut-outs the ratio of the primary windings to the secondary winding may be changed at will, to insure any predetermined heat effect for welding, one arrangement, by way of example, being shown in Fig. 9 to which reference is made as follows: 38 indicates a switch of any standard or preferred form of construction having a movable arm 38a connected to the main 19 and a plurality of terminals 39, connected by leads to taps, one for each lead, leading from one of the primary windings, as indicated at 20. 41 indicates a switch for controlling the connection of the main 19a to other primary windings. The switch 41 consists of two connected arms 41a, 41a', which in one position engage terminals 42, 42a, respectively, and in another position the arm 41a engages a terminal 43. A lead 44 connects the main 19a to the terminal 42a and a separate lead 44a connects this terminal to the outer end of winding 20i. A lead 45 connects the terminal 42 to the connection between windings 20c, 20d. A lead 46 connects the switch arm 41a to the inner end of winding 20g. A lead 47 connects the switch arm 41a' to terminal 43 and a lead 48 connects this terminal to the outer end of winding 20f. It will thus be seen that when the switch arms 41a, 41a', are in the position shown in Fig. 9, the windings 20d, 20c, 20f, are in parallel relation to the windings 20g, 20h, 20i; and that when the switch arms 41a, 41a', are moved to the position shown in dotted lines all of the windings 20, 20a, 20b, etc., are connected in series. 49 indicates a variable reactance coil connected in the main 19a and arranged to regulate the voltage separately from or supplemental to the regulation resulting from the operation of either or both switches 38, 41, so that the voltage across the electrodes and the resulting heat for welding may be regulated and controlled to secure a proper weld of the work A.

From the foregoing description it will be noted that the primary windings are stationarily mounted so that the supply mains may be readily and economically connected thereto in any desired manner and that the terminals of the secondary winding are connected directly to the electrodes, whereby the secondary winding and the electrodes may rotate as a unit, so that the provision of brushes and their mountings and other fittings are entirely eliminated. It will also be noted that since in the arrangement disclosed, no lines of force are cut by moving conductors, there is no rotative effect on the secondary member.

No claim is made herein to the transformer construction per se and the mounting of its secondary member broadly, as such subject-matter is disclosed and claimed in my co-pending application Serial No. 293,445, filed September 5, 1939.

To those skilled in the art to which my invention relates, many changes in construction and widely differing embodiments and applications of the invention will be apparent without departing from the scope thereof. My disclosures and the description are intended to be purely illustrative and not in any sense limiting.

What I claim is:

In welding apparatus, the combination with a base, of a support mounted on and over said base in spaced relation thereto, spaced hangers depending from said support and each provided with a bearing, a conductor rotatably mounted at its opposite ends in said bearings, a separate conductor fixedly related to and insulated from said first mentioned conductor, electrodes electrically connected to said conductors, respectively, and rotatable therewith, said separate conductor and electrodes being entirely disposed between said bearings, the hanger for the bearing adjacent to said electrodes being removably mounted on said support, and a single phase transformer entirely disposed between said bearings, the primary winding of said transformer being fixedly related to said support and the secondary winding of said transformer being fixedly related to said conductors and electrically connected thereto.

HOWARD I. MORRIS.